D. B. LOVEJOY.
COTTON HARVESTER.
APPLICATION FILED FEB. 28, 1913.

1,107,083.

Patented Aug. 11, 1914.
5 SHEETS—SHEET 1.

Witnesses
E. R. Ruppert.

Inventor
Daniel B. Lovejoy

By Victor J. Evans
Attorney

D. B. LOVEJOY.
COTTON HARVESTER.
APPLICATION FILED FEB. 28, 1913.

1,107,083.

Patented Aug. 11, 1914.
5 SHEETS—SHEET 2.

Witnesses

Inventor
Daniel B. Lovejoy
By Victor J. Evans
Attorney

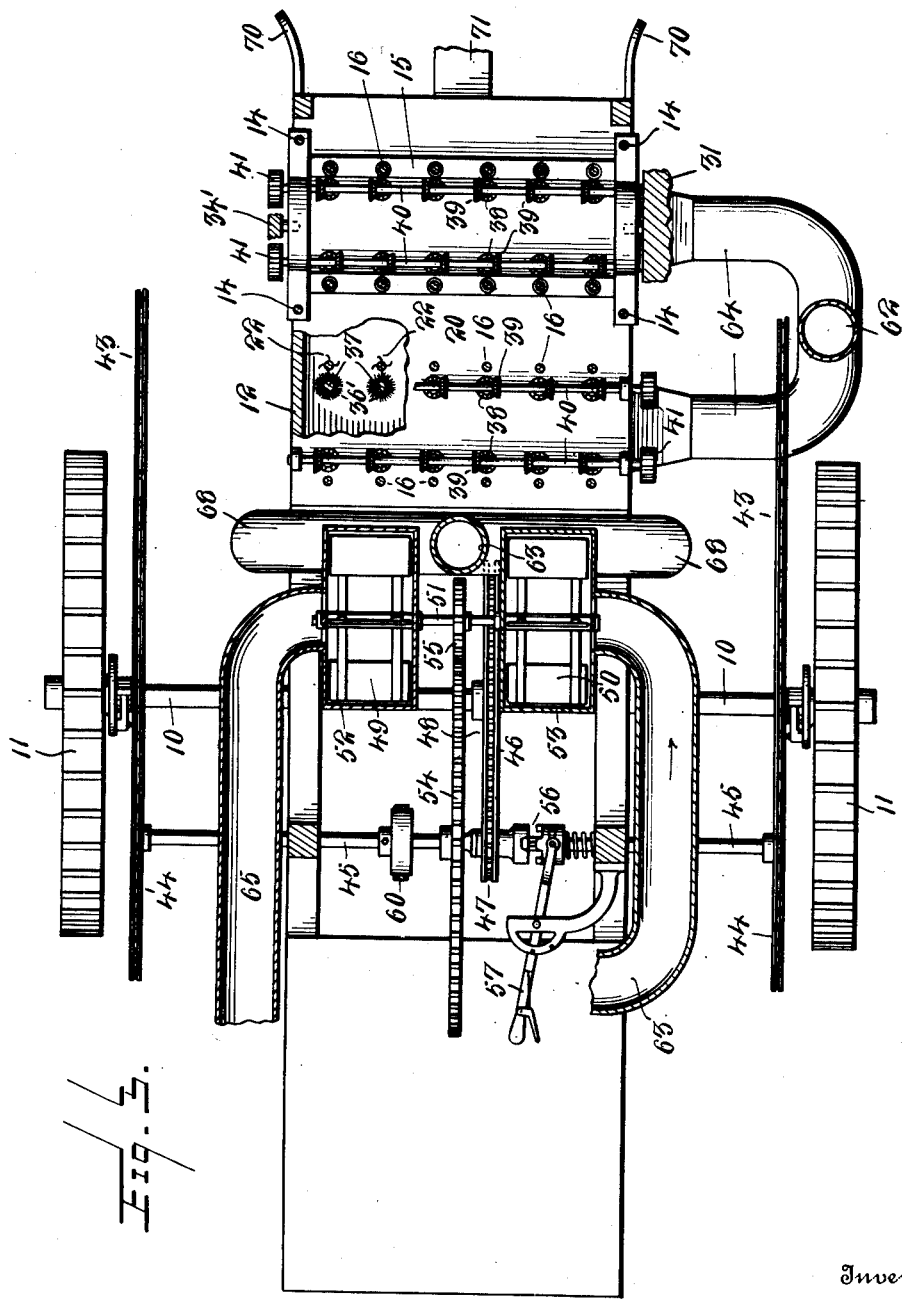

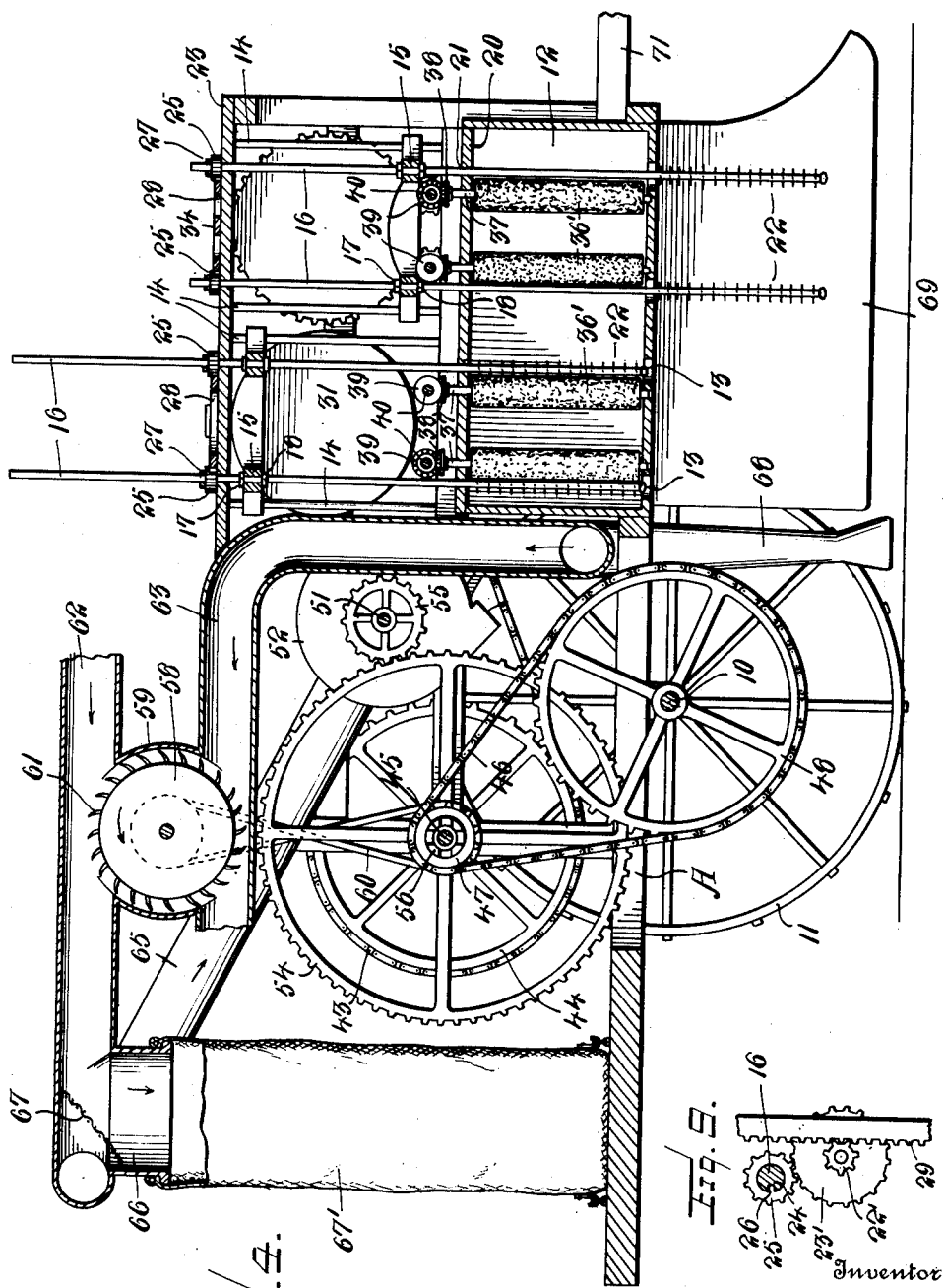

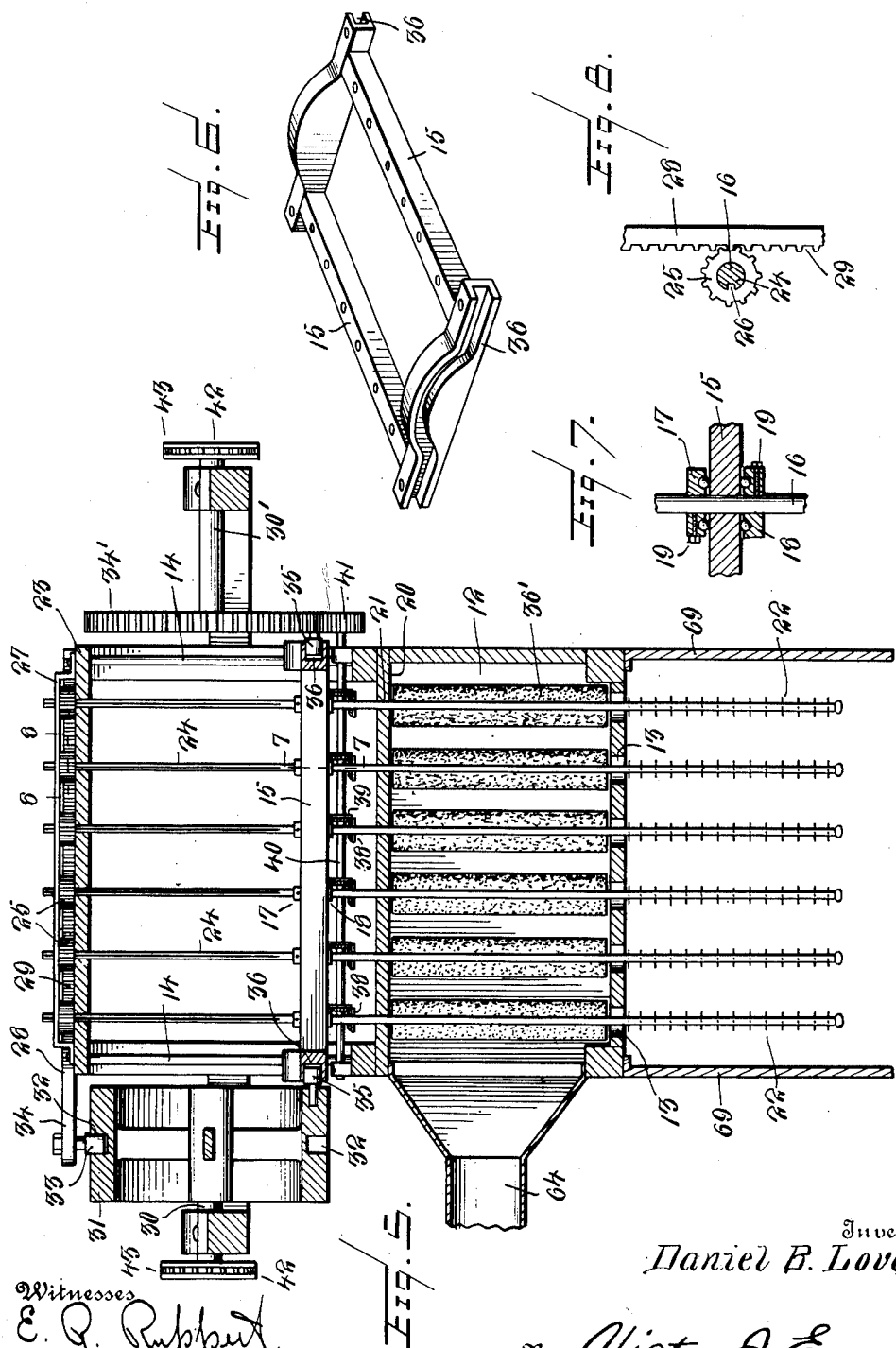

UNITED STATES PATENT OFFICE.

DANIEL B. LOVEJOY, OF PURMELA, TEXAS.

COTTON-HARVESTER.

1,107,083.

Specification of Letters Patent. Patented Aug. 11, 1914.

Application filed February 28, 1913. Serial No. 751,354.

*To all whom it may concern:*

Be it known that I, DANIEL B. LOVEJOY, a citizen of the United States, residing at Purmela, in the county of Coryell and State of Texas, have invented new and useful Improvements in Cotton-Harvesters, of which the following is a specification.

This invention relates to machines for picking or harvesting cotton of that class in which spindles having curved teeth to engage the cotton are mounted for reciprocation to bring them into and out of engagement with the cotton plants and also for rotation in two directions, said spindles being rotated in one direction to detach the cotton from the plants and in another direction to permit the cotton to be disengaged from the spindles.

The present invention has for its object to produce a portable machine of simple and efficient construction embodying the aforesaid principle and equipped with spindles of the character described and with means for supporting and properly actuating the same.

A further object of the invention is to produce a portable machine of the character described having suction means for conveying the cotton after being detached from the picking spindles to a receptacle carried on the machine.

A further object of the invention is to produce a portable machine of the character described having means for gathering waste cotton from the ground and for cleaning the same before being conveyed to the receptacle.

A further object of the invention is to produce a portable machine of the character described having a cleaner of simple and improved construction.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
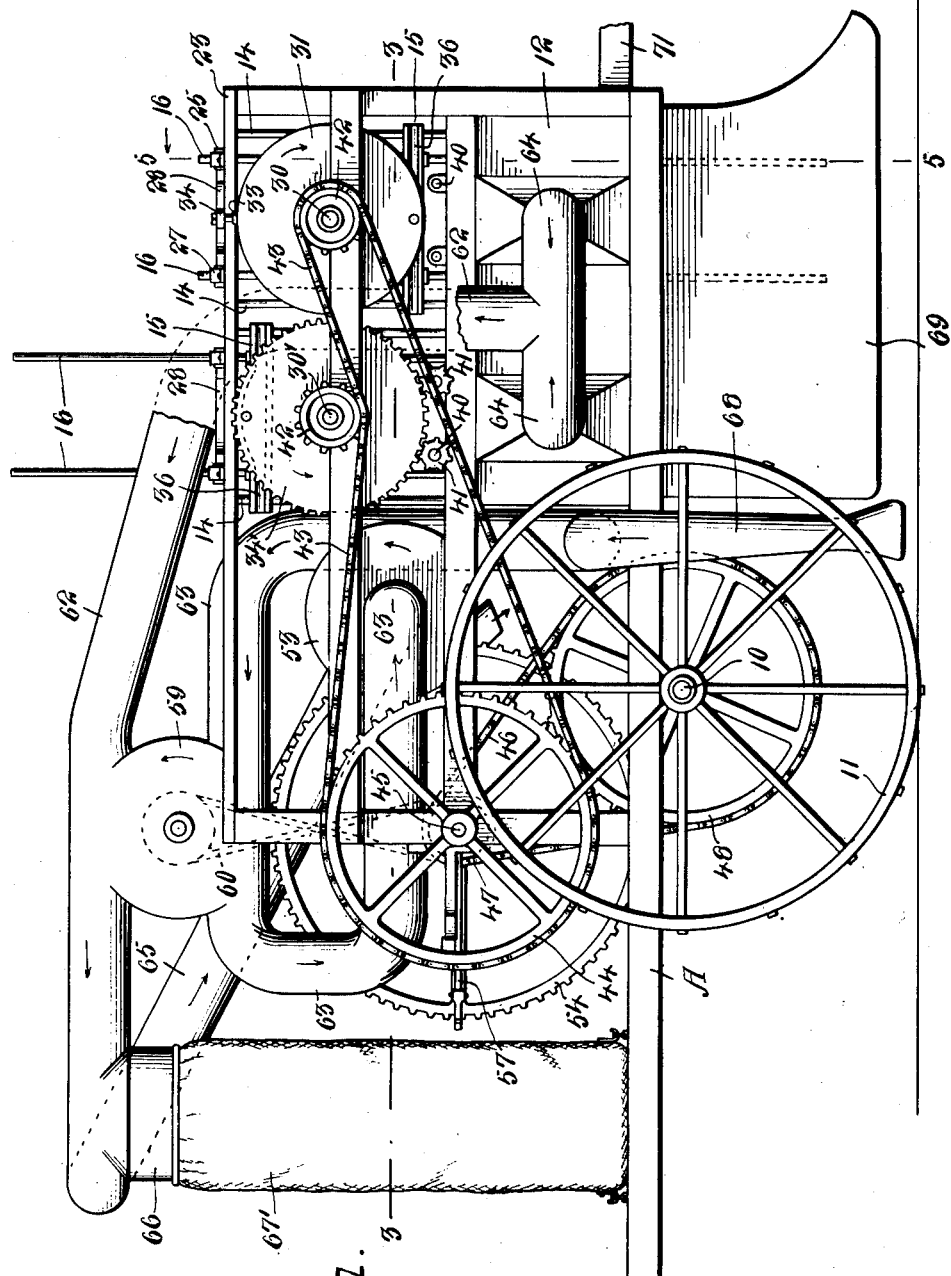
Figure 2:
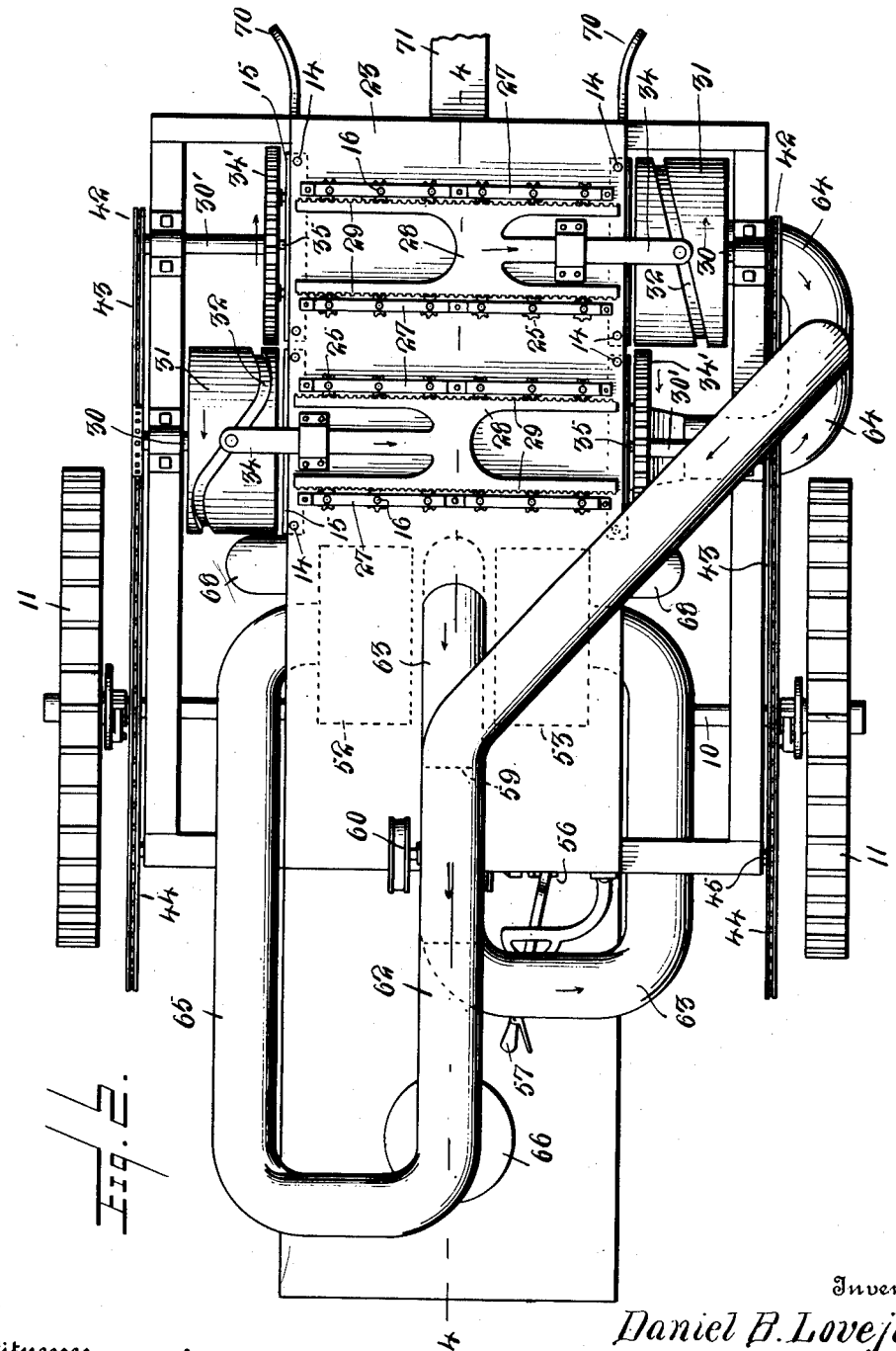

In the drawing,—Figure 1 is a side elevation of a machine constructed in accordance with the invention. Fig. 2 is a top plan view of the same. Fig. 3 is a horizontal sectional view taken on the plane indicated by the line 3—3 in Fig. 1. Fig. 4 is a longitudinal vertical sectional view taken on the line 4—4 in Fig. 2. Fig. 5 is a vertical transverse sectional view taken on the line 5—5 in Fig. 1. Fig. 6 is a perspective detail view of one of the reciprocatory spindle carriers. Fig. 7 is a sectional detail view taken on the line 7—7 in Fig. 5. Fig. 8 is a sectional detail view taken on the line 8—8 in Fig. 5. Fig. 9 is a detail plan view showing a modified construction for actuating the spindles.

Corresponding parts in the several figures are denoted by like characters of reference.

The frame A of the improved machine is supported on an axle 10 having ground engaging wheels 11 which may be cleated or grouted in the usual manner to prevent slipping, said wheels constituting the source of power for driving the moving parts of the machine. It is desired to be understood that said wheels may be mounted on the axle by means including clutches that will permit the machine to be backed without driving the moving parts thereof reversely, but as such clutch means are very common in the art, it is not deemed necessary to illustrate or to particularly describe the same.

The frame supports a casing 12 at the front end thereof, said casing being made substantially air-tight, except for the necessary openings 13 in the bottom thereof through which the picking spindles are projected, as will be presently described. Rising above the casing 12 are vertical guide rods 14 on which the spindle carriers are supported for vertical reciprocatory movement. Two spindle carriers have been shown in the accompanying drawings, said carriers being arranged in tandem, one in advance of the other, but it is to be understood that while two is the preferred number, any desired number may be used. Each spindle carrier consists of a plate or frame 15 through which the spindles 16 project, said spindles being preferably arranged in two transverse rows, and said spindles being provided with anti-friction collars 17, 18 arranged above and below the carrier 15 to reduce the friction caused by end thrust in either direction. The anti-friction elements 17 and 18 being secured on the spindles by means of fastening means, such as set screws 19, also serve to retain the spindles in their respective bearings and to prevent endwise displacement thereof with respect to the carrier 15.

The spindles are connected with the carrier in such fashion that approximately one-third of the length of each spindle will project upwardly and two-thirds of the length will project downwardly with respect to the carrier. The spindles project downwardly through the top 20 of the casing 12 which is provided with apertures 21 snugly fitting around the spindles so that while the latter may reciprocate and rotate freely there would be little opportunity for air to enter the casing around the spindles. The lower extremity of each spindle is provided for approximately one-third of its length with arcuate pins 22, see Fig. 3, extending radially therefrom, the pins of the spindles of each row being all curved in the same direction. The approximate one-third of each spindle which projects upwardly from the carrier is guided through a top board or plate 23, and said upper third of each spindle has a groove 24. Each spindle is provided with a pinion 25 through the hub of which it loosely extends, each pinion being provided with a key 26 engaging the groove 24 in the spindle. The several pinions are supported loosely on the top plate 23 where they are confined by means of a yoke or bridge piece 27. As will be seen by reference to Fig. 2 of the drawing, each set of spindles (the word "set" being used to indicate all the spindles associated with each carrier) is arranged in two transverse rows extending upwardly through the top plate 23. Supported on said top plate, between the rows of spindles of each set, is a reciprocatory rack plate 28 having racks 29, each engaging the pinions 25 associated with a row of spindles. It will be seen that by reciprocating the rack plate, the spindles will be rotated first in one direction, then in the opposite direction, and it will also be seen that the spindles of the two rows engaged by the plate will be rotated reversely with respect to each other. For this reason, the curved pins associated with the spindles of the two rows of each set will be curved in opposite directions, so that all the spindles of each set will simultaneously be rotated in the proper direction to gather cotton from the plants or to discharge the same, as will be hereinafter described. For the purpose of speeding the spindles 16 there may be interposed between the pinion 25 of each spindle and the adjacent rack bar 29 intermediate gearing, as indicated in Fig. 9, said intermediate gearing including a small pinion 22' meshing with the rack 29 and a larger pinion 23' connected for rotation with said small pinion and meshing with the pinion 25.

Suitably supported transverse shafts 30 are provided, one for each spindle carrier. Each of said transverse shafts carries a drum 31 having a circumferential cam groove 32 engaged by an anti-friction member, such as a roller 33 carried by an arm 34 extending from one of the rack plates 28, said rack plates being thus transversely reciprocated by the rotary motion of the disks 31. Shafts 30' are supported for rotation in alinement with the shafts 30, and each of said shafts 30' carries a spur wheel 34', the said spur wheels and the cam-grooved drums 31 being located adjacent to opposite sides of the machine. The cam-grooved drum 31 and the spur wheel 34' on each shaft 30, 30' are each provided on its inner face with an anti-friction roller 35 operating in a groove 36, said grooves being formed in the ends of each spindle carrier 15. It follows that by the rotation of the shafts 30 the spindle carriers will be reciprocated vertically, said carriers being guided on the rods 14. When two spindle carriers are used, as shown in the drawings, the parts are preferably so assembled and timed that said spindle carriers will move in opposite directions, as will be clearly understood by reference to Figs. 1 and 4 of the drawings. The casing 12 contains several transverse rows of cylindrical brushes 36', juxtaposed to the spindles 16, the shafts 37 of said brushes being stepped in the bottom of the casing and extended upwardly through the top thereof, said shafts being provided at their upper ends with bevel pinions 38 meshing with bevel pinions 39 on transverse shafts 40, said transverse shafts being provided with pinions 41 meshing with the spur wheels 34' on the shafts 30 from which they receive rotary motion which is in turn transmitted to the brushes. Each row of brushes will thus be constantly rotated in one direction, and it is obvious that the working parts are so arranged and assembled that the brushes will operate to detach the cotton from the curved pins of the spindles when the latter are rotated in the proper direction for this purpose.

The shafts 30 are provided with sprocket wheels 42 that receive motion through the medium of chains or link belts 43 from sprocket wheels 44 on a transverse shaft 45 which is supported for rotation on the frame of the machine and which receives motion direct from the axle 10 through the medium of a chain 46 and sprockets 47, 48.

Twin rotary fans 49, 50 are supported on a shaft 51 that extends through the fan casings 52, 53 which are supported in rear of the casing 12. The fan carrying shaft 51 receives motion from the driven shaft 45 by intermeshing spur wheels 54, 55 which may be so proportioned that the fans will be properly speeded. The means for transmitting motion from the axle of the machine to the shaft 45 preferably includes a clutch 56 and a lever 57, whereby said clutch may be thrown into and out of gear in order that the machine may be transported without motion being transmitted to the moving parts thereof.

A cleaner is provided, the same including a drum 58 supported for rotation within a casing 59 and driven from the shaft 45 by means of a crossed belt 60, said drum being provided at its circumference with teeth or spikes 61 which are curved in the direction of its rotation, the top portion of the drum moving rearwardly, as indicated by the arrow in Fig. 4. The curved teeth 61 of the drum 58 project about half way into a duct 62 which is connected with the top of the casing 59, and said teeth 61 project nearly or quite through a duct 63 which is connected with the bottom of the cleaner casing. One end of the duct 62 is provided with branches 64 that are connected with the casing 12. The end of the duct 62 leading away from the cleaner casing 59 has a return bend 65 which is connected with the eye or inlet of the fan casing 52. The duct 62 is provided near the return bend 65 with a downwardly extending outlet chute with which the receptacle, such as a bag 67', may be detachably connected in any convenient manner. Within the duct 62 adjacent to the return bend is supported a screen 67 serving as a deflector, whereby cotton coming through the duct from the compartment 12 will be deflected downwardly into the receptacle 67'. The duct 63 is provided at one end with downwardly extending limbs 68, the lower intake ends of which are supported a short distance above the ground adjacent to the two sides of the row of plants that is to be operated upon. The end of the duct 63 that extends rearwardly from the casing 59 of the cleaner is bent downwardly and forwardly and is connected with the eye or intake of the fan casing 53.

The frame of the machine carries downwardly extending shields 69, one at each side of the casing 12, said shields being bent outwardly at their front ends, as will be best seen at 70 in Fig. 3 of the drawings. The plants that are to be operated upon will pass between said shields and beneath the casing 12 in the path of the reciprocatory picking spindles, as will be readily understood. The frame of the machine has a forwardly extending tongue 71 which may be utilized for the attachment of draft. A seat for the driver may also be provided. It will, however, be understood that the machine may, when preferred, be operated by means of a motor of any convenient and well known type.

From the foregoing description, taken in connection with the drawings hereto annexed, the operation and advantages of this invention will be readily understood. When the machine is transported to or from the field, the moving parts may be thrown out of gear by the clutch 56. When in operation, the machine straddles the row of plants that are to be operated upon, said plants being guided between the shields 69. The picker spindles 16 will be reciprocated vertically with the carriers 15, and when the lower ends of said spindles having the curved teeth 22 are projected downwardly through the apertures 13 in the bottom of the casing 12, said spindles will be rotated in the proper direction to cause the pins or teeth 22 to catch hold of the cotton which will be wound about the spindles 16, being thus detached from the plants. The spindles are to be placed sufficiently close together to insure certainty of operation as the machine advances. When the toothed ends of the spindles are retracted within the casing 12, the said spindles are reversely rotated and the cotton will be detached therefrom by the action of the constantly rotating brushes 36', and as the cotton is detached from the spindles it comes within the range of the suction established in the ducts 64 by the fan 49, and the cotton will pass through said ducts and through the duct 62 over the cleaner 58 to the point of discharge, whereby the screen 67 is deflected through the chute 66 into the receptacle 67', the air current wherein the cotton was held in suspension passing through the screen and duct to the intake of the fan casing 52, being discharged at the periphery of the latter in the customary manner.

It will be understood that such sand and dust as may have been commingled with the cotton will pass through the screen 67, being held in suspension by the air current and will be discharged at the periphery of the fan casing. Loose cotton that may have been beaten to the ground by inclement weather will be taken through the intakes of the limbs or spouts 68 of the air duct 63 and will be carried beneath the cleaner 58 which rotates in such a manner as to bring its curved teeth in opposition to the air current carrying the loose cotton in suspension. The cotton will be taken up by the teeth 61 of the cleaner, but dirt and trash will pass between the teeth and be carried suspended in the air current to the intake of the fan casing 53, being discharged at the periphery of the latter. The cotton adhering to the teeth 61 of the cleaner will be carried by the latter half way around and into the path of the air current passing through the duct 52, whereby it will be detached from the teeth of the cleaner and be carried along with the picked cotton to the point of discharge.

The improved cotton picker or harvester, as will be seen from the foregoing description, is of comparatively simple construction, and it has been demonstrated that it will pick the cotton easier and with comparatively slight expenditure of power, little manual attention being required beyond that of the driver of the machine and perhaps a helper to remove the filled bags and replace the same with empty ones.

Having thus described the invention, what is claimed as new, is:—

1. In a cotton harvester, a reciprocatory picker spindle having curved cotton engaging teeth, means for rotating the spindle alternately in opposite directions synchronously with its reciprocatory movement in opposite directions, and rotary brush means operating constantly in one direction to detach the cotton from the spindles.

2. In a cotton harvester, a casing, picker spindles supported for vertical reciprocation and having their lower portions provided with curved teeth, means for alternately projecting the spindles through the bottom of the casing and retracting said spindles within the casing, rotary brushes within the casing supported contiguous to the toothed portions of the spindles when the latter are retracted, a duct connected with the casing, and means for establishing a partial vacuum in said duct.

3. In a cotton harvester, a casing, guide rods extending upwardly therefrom, a carrier supported for reciprocation on said guide rods, spindles supported by the carrier and having portions extending downwardly within the casing and provided with toothed lower ends which may be projected through the bottom of the casing, said carrier being provided with grooves at the ends thereof, shafts supported for rotation, members on said shafts having anti-friction rollers operating in the grooves, and means for rotating the spindles in opposite directions as the carrier is being reciprocated in opposite directions; in combination with rotary brushes supported within the casing adjacent and in parallel relation to the spindles, and means for constantly rotating said brushes in one direction.

4. In a cotton harvester, a casing, guide rods extending upwardly therefrom, a carrier supported for reciprocation on the guide rods, means for reciprocating the carrier, picker spindles supported for rotation on the carrier and having portions extending downwardly within the casing and provided with toothed lower ends adapted to be projected through the bottom of the casing, said spindles being also provided with portions extending upwardly from the carrier and having longitudinal grooves, a top plate through which the upper ends of the spindles are guided, pinions supported on the spindles above the top plate and having keys engaging the longitudinal grooves, means for preventing vertical displacement of the pinions with respect to the top plate, a reciprocatory rack engaging the pinions, and means for reciprocating the rack; in combination with rotary brushes supported within the casing adjacent and in parallel relation to the spindles, and means for constantly rotating said brushes in one direction.

5. In a cotton harvester, a wheel supported frame, a casing mounted thereon and having downwardly extending shields, a top plate supported above and spaced from the casing, a carrier guided for vertical reciprocation between the casing and the top plate, pinions supported on the top plate, picker spindles supported by the carrier and guided through the pinions for rotation therewith, a reciprocatory rack engaging the pinions, and means for reciprocating the rack; said picker spindles being provided with portions extending downwardly within the casing and having their lower ends provided with curved teeth and adapted to project through the bottom of the casing; in combination with rotary brushes supported within the casing adjacent and in parallel relation to the spindles, and means for constantly rotating said brushes in one direction.

6. In a cotton harvester, a wheel supported frame, a casing mounted thereon and having downwardly extending shields, a top plate supported above and spaced from the casing, a carrier guided for vertical reciprocation between the casing and the top plate, pinions supported on the top plate, picker spindles supported by the carrier and guided through the pinions for rotation therewith, a reciprocatory rack engaging the pinions, and means for reciprocating the rack; said picker spindles being provided with portions extending downwardly within the casing and having their lower ends provided with curved teeth and adapted to project through the bottom of the casing; in combination with rotary brushes supported within the casing in parallel relation to the spindles and in proximity to the toothed portions of the spindles when the latter are retracted, and means for rotating the brushes constantly in one direction.

7. In a cotton harvester, the combination with a casing and with suitable supporting means, of sets of reciprocatory and rotary picker spindles supported outside of the casing and having portions that project within the same, the lower ends of said spindles being provided with curved teeth, and said lower portions being adapted to be projected through the bottom of the casing, means for rotating the spindles alternately in opposite directions synchronously with their reciprocatory movement in opposite directions, rotary brushes within the casing supported in parallel relation to the spindles for engaging the curved teeth of the spindles to detach the cotton from the spindles when the latter are retracted, means for rotating the brushes constantly in one direction, a duct connected at one end with the casing, and means for establishing within said duct a partial vacuum for carrying the detached cotton from the casing.

8. In a cotton harvester, the combination with means for detaching the cotton from the plants and doffing means engaging the detaching means, of suction means for conveying the cotton to a receptacle, suction means for raising fallen cotton from the ground, and a rotary cleaner arranged in the path of the last mentioned cotton to separate it from impurities, said rotary cleaner being arranged to discharge the cotton intercepted thereby in the duct leading to the place of deposit.

9. In a cotton harvester, means for picking cotton from the plants, means for picking waste cotton from the ground, ducts into which the two grades of cotton are delivered, means for setting up suction in said ducts independently of one another, a cleaner casing located intermediate the two ducts and communicating with each of said ducts, a rotary cleaner within said casing having teeth projecting within the ducts and curved in the direction of the air current in the duct through which picked cotton is conveyed, an outlet associated with said duct in rear of the cleaner, and a screen deflector within said duct adjacent to the outlet.

In testimony whereof I affix my signature in presence of two witnesses.

DANIEL B. LOVEJOY.

Witnesses:
 JIM BALLARD,
 FRED SALYER.